W. P. MILLER.
Saw-Teeth.

No. 211,035.  Patented Dec. 17, 1878.

Attest;
Geo. H. Graham.
Alexander Scott.

Inventor;
Warren P. Miller,
by Munson & Philipp
Attorneys.

UNITED STATES PATENT OFFICE.

WARREN P. MILLER, OF BROOKLYN, ASSIGNOR TO R. HOE & COMPANY, OF NEW YORK, N. Y.

IMPROVEMENT IN SAW-TEETH.

Specification forming part of Letters Patent No. 211,035, dated December 17, 1878; application filed June 1, 1878.

*To all whom it may concern:*

Be it known that I, WARREN P. MILLER, of the city of Brooklyn, county of Kings, and State of New York, have invented certain new and useful Improvements in Saws; and I do hereby declare the following to be a full, clear, and exact description of the same, reference being had to the accompanying drawing, forming a part of this specification, in which—

Figure 1:
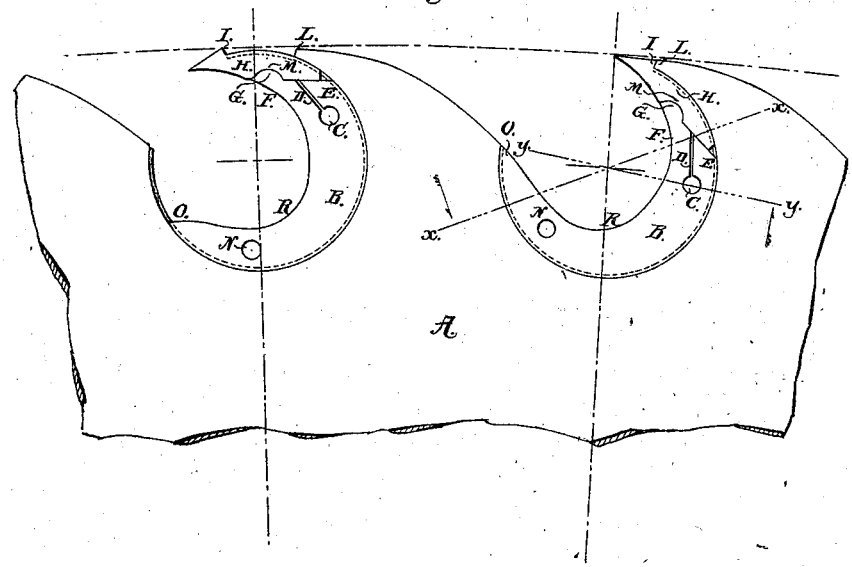
Figure 2:
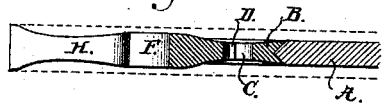
Figure 3:

Figure 1 represents a section of a circular saw provided with shanks, cutting-teeth, and sockets to receive them. Fig. 2 is a section of the shank and portion of the saw-plate, taken on line $y$ $y$, Fig. 1, a portion of the cutting-tooth and shank being shown in elevation. Fig. 3 is a section of the shank, cutting-bit, and portion of the saw-plate, taken on line $x$ $x$, Fig. 1.

Heretofore saws have been provided with sockets formed on circular lines embracing more than one hundred and eighty degrees of a circle, adapted to receive shanks having cutting-teeth made to conform thereto; but the shanks and cutting-teeth were made in one piece, and, after being worn and ground away so that they no longer could be retained in their sockets, had to be thrown away, thus incurring loss. Saws had also been formed with sockets cut upon circular lines, forming unequal segments, for receiving shanks and cutting-teeth, each independent of the other, the shanks resting upon the bases of the sockets formed between the two unequal segments, which prevented the teeth from moving when they were cutting.

The object of my invention is to provide saws with sockets and shanks and teeth independent of each other, the sockets, shanks, and teeth being cut on curved lines comprising more than one hundred and eighty degrees of a circle, and the teeth being held in said sockets by the shanks, and prevented from moving when cutting; and it consists, first, in the combination of a tooth having a shoulder with an independent shank, said tooth and shank fitting in a socket cut in curved lines, as will be hereinafter more fully described; second, in the combination of a cutting-tooth having a shoulder on its back and a depression in its face with an independent shank having a projection on its jaw, to enter said depression and carry and retain in its socket the said tooth; third, in the combination of a cutting-tooth having a shoulder with an independent shank provided with an elastic jaw to retain said tooth in its socket; fourth, in the combination of a cutting-tooth and independent shank with a socket in the saw-plate cut on curved lines comprising more than one hundred and eighty degrees of a circle to receive said cutting-tooth and shank.

In the drawings, A is a section of a saw-plate, having cut therein sockets on curved lines comprising more than one hundred and eighty degrees of a circle, the inner edges of said sockets being provided with V-shaped projections, as shown. B are shanks cut on circular lines conforming to those of the sockets, and provided with V-shaped grooves on their outer edges, corresponding to the V-shaped projections on the sockets, and nicely fitting the same when in use. These shanks are preferably pierced at C and slotted at D, leaving heels E and jaws F, the latter of which are elastic, and are provided with projections G, for a purpose to be explained.

The shanks are preferably made thicker at their inner faces, from the end of their jaws to about the point R, than the saw-plate, but not thicker than the width of the cutting-edges of the teeth, for the purpose of preventing the escape of the chips while they are in the saw-kerf. The faces of the teeth are also made broader than the thickness of the saw-plate, and yet of less width than their cutting-edges, for the same purpose.

H are cutting teeth or bits, struck up from hot steel rods in dies, formed therein with V-shaped grooves at their backs to fit the V-shaped projections of the sockets, and with shoulders I at their backs, preferably square in form, that abut when in use against square projections L on the saw-plate, and with depressions M in their faces, for the reception of the projections G on the jaws of the shanks.

The shanks are provided with holes N at their heels O, to enable pins on a wrench to be inserted in them and the holes C, to turn the shanks and their cutting-teeth in their sockets.

As shown in the drawings, the cutting-teeth, from their shoulders I, and the shanks, to their heels O, are cut on curved lines comprising more than one hundred and eighty degrees of a circle, which allows them to be inserted when in the position shown in the left-hand portion of Fig. 1 of the drawings, and to be held securely in position when inserted, as shown in the right-hand portion of said figure.

The projections G on the shanks B, entering the depressions M in the faces of the cutting-teeth, serve to carry the latter into their sockets and retain them there, the jaws F yielding to accommodate different thicknesses of the cutting-teeth. The shoulders I on the back of said cutting-teeth, abutting against the shoulders L on the saw-plate, prevent said teeth from turning when cutting.

It is obvious that the sockets may be cut on curved lines not exactly circular, but approximating thereto, and the shanks and cutting-bits made to conform thereto, without departing from my invention.

In some cases the slot D may be dispensed with; but I prefer to employ the same to render the jaw F elastic.

What I claim as new, and desire to secure by Letters Patent, is—

1. The combination, with a cutting-tooth having a shoulder at its back, of an independent shank, the two fitting in a socket cut on curved lines comprising more than one hundred and eighty degrees of a circle, substantially as described.

2. The combination of a cutting-tooth having a shoulder on its back and a depression in its face with an independent shank having a projection on its jaw, to enter said depression and carry and retain in its socket the said tooth, substantially as described.

3. The combination of a cutting-tooth having a shoulder on its back with an independent shank provided with an elastic jaw to retain said tooth in its socket, substantially as described.

4. The combination of a cutting-tooth having a shoulder on its back and independent shank with a socket in the saw-plate cut on a curve comprising more than one hundred and eighty degrees of a circle to receive said cutting-tooth and shank, substantially as described.

In testimony whereof I have signed my name to this specification in the presence of two subscribing witnesses.

WARREN P. MILLER.

Witnesses:
H. T. MUNSON,
GEO. H. GRAHAM.